April 4, 1950 V. J. COOPER 2,502,557

FREQUENCY MODULATED TRANSMITTER

Filed July 22, 1947

INVENTOR.

Victor James Cooper

BY Harry Tunick.

ATTORNEY

Patented Apr. 4, 1950 2,502,557

UNITED STATES PATENT OFFICE 2,502,557

FREQUENCY-MODULATED TRANSMITTER

Victor James Cooper, Writtle, England, assignor, by mesne assignments, to Radio Corporation of America, New York, N. Y., a corporation of Delaware Application July 22, 1947, Serial No. 762,754
In Great Britain April 15, 1946

Section 1, Public Law 690, August 8, 1946
Patent expires April 15, 1966

10 Claims. (Cl. 250—17)

Figures 1, 2, 3:
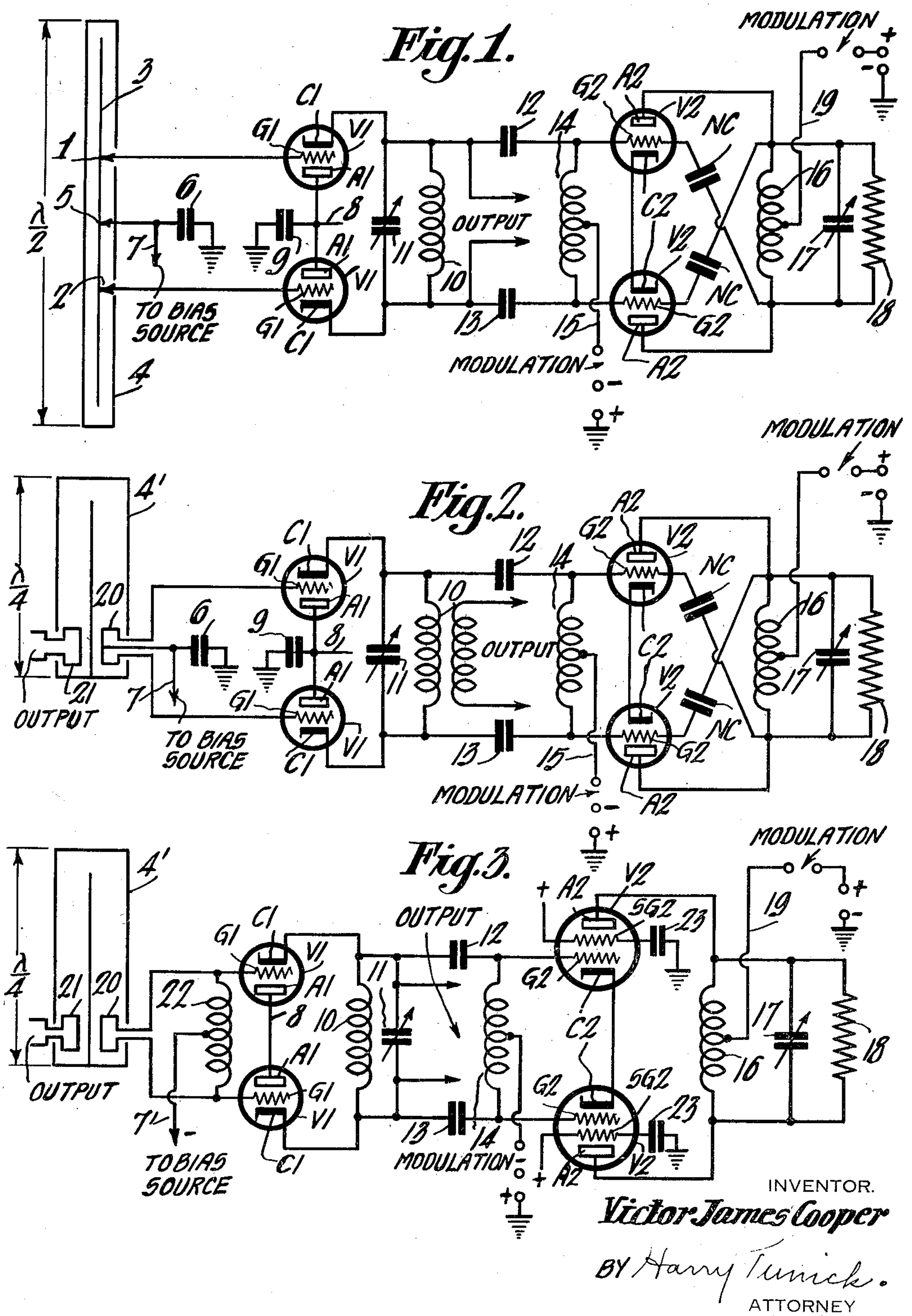

This invention relates to frequency modulated transmitters and has for its object to provide improved frequency modulated transmitters of high mean frequency stability and high efficiency. The term frequency modulated is used in this specification to include phase modulation, which may be looked upon as a special case of frequency modulation, namely, that in which the maximum frequency deviation is one cycle.

A considerable economy can be achieved in a frequency modulated transmitter if the modulation is applied at a high power level and the present invention provides a very simple and easily constructed transmitter in which this is achieved.

According to this invention a frequency modulated transmitter comprises an electron discharge tube oscillator having a grid frequency determining circuit constituted by a concentric tubular or equivalent line, said oscillator also having a cathode tuned circuit; an electron discharge tube circuit arrangement connected and operated to act as a reactance included in said cathode tuned circuit and means for controlling the potential of one or more of the electrodes of said last mentioned circuit arrangement, in accordance with modulation, so as to modify the reactance thereby presented, and thereby effect frequency modulation of the oscillator.

The invention is illustrated in the accompanying drawings which show diagrammatically a number of embodiments.

Referring to Fig. 1 which shows an embodiment wherein the oscillator employs a grid frequency determining circuit of the half wave line type, said oscillator comprises a pair of tubes V1 shown as triodes though, of course, tubes with more than three electrodes could be used having their grids G1 adjustably tapped at points 1 and 2 upon the central conductor 3 of a concentric tube resonator 4 of the half wave length type and preferably one half wave length $$\left(\frac{\lambda}{2}\right)$$

long. A point 5 of symmetry between the two grid tappings 1 and 2 on the line is earthed through a suitable condenser 6 and the correct operating grid potential is applied at this point through lead 7 while the anodes A1 of the triodes (to which suitable operating positive potential is applied through lead 8) are also earthed through a suitable condenser 9. The cathodes C1 are connected together through a parallel tuned circuit 10, 11, the ends of which are connected through condensers 12, 13 to the grids G2 of two modulating triodes or other suitable tubes V2, the cathodes C2 of these tubes being connected together and the grids G2 also being connected by the usual coil 14 through the mid-point of which bias potential is applied via lead 15. The anodes A2 of the modulating triodes V2 are connected to opposite ends of a parallel tuned circuit 16, 17 which is preferably shunted by a suitable resistance 18 and each anode is cross connected to the grid of the other tube through a neutralizing condenser NC. Anode potential is applied to the modulating tubes V2 through lead 19 and the mid-point of the coil 16.

With this arrangement the output power may be obtained by coupling a load into the tuned circuit in the cathode circuit of the oscillator, i. e. power output may be taken off from the ends of the coil 10. Modulating potential may be applied to the grids of the modulating tubes V2 through the centre point of the grid coil 14 or to the anodes of the modulating tubes through the centre point of the coil 16.

The precise circuit connections of Fig. 1 are not essential. For example, instead of connecting the grids of the oscillator tubes directly to the resonator they may be connected thereto through coupling capacities or by mutual inductance, the return connection from the resonator to the source of desired D. C. potential being made also in any convenient manner well known per se.

Again it is not necessary that the resonator should be of the half wave line type, for a quarter wave line type resonator may be employed. Again the modulated power may be taken off otherwise than from the cathode tuned circuit and there are, moreover, a number of ways in which the modulating potential may be applied.

In one example of further modification shown in Fig. 2 a quarter wave tubular line resonator 4' is employed and the grids G1 of the oscillator tubes V1 are coupled thereto by means of a mutual coupling loop 20 connected between the grids and inserted in manner well known per se at a suitable point in the line structure, said coupling loop having a symmetrical mid-point earthed through a condenser 6, the required D. C. potential being applied at this point via lead 7. A similar coupling loop 21 may be suitably positioned within the line structure and used as an output loop for the modulated power. As before, modulating input potential may be applied through the grid coil 14 or through the anode coil 16 of the modulating tubes V2.

In a yet further modification shown in Fig.3 the grids G1 of the oscillator tubes V1 are connected together through a grid coil 22 having a centre point through which negative D. C. potential is applied via lead 7' and said grids are connected through a mutual inductance coupling loop 20 arranged in a quarter wave resonator 4' much as in Fig. 2, except that due to the provision of the centre tapped grid coil 22 the effective centre tapping (in Fig. 2) on the mutual inductance loop is no longer required. Modulated power output may be taken off by means of a second loop in the tubular resonator as in Fig. 2 or, as in Fig. 1 from the cathode tuned circuit, by capacitive or inductive coupling.

Where the modulating tubes connected to act as variable reactances in the cathode tuned circuit are multi-grid tubes, the additional grids may be used for modulating input. In Fig. 3, said tubes are screen grid tubes having screen grids SG2 connected to earth through suitable condensers 23. Modulating potentials may be applied either through the anode coil 16 (via lead 19) or through the grid coil 14 (via lead 15) or on the screen grids SG2 and where desired two or more of the described methods of applying modulating potential or taking off modulated power may be used in combination.

The oscillator arrangements in transmitters in accordance with this invention have a very high degree of frequency stability inherently and accordingly the mean frequency stability is high. Furthermore, the use of the electron discharge tube variable reactance for modifying the natural frequency of the cathode tuned circuit of the oscillator is found to result in sensible rectilinear frequency deviation of a useful order, it being found that high mean stabilities are obtainable with frequency deviations of at least ±75 kc./s. at frequencies from 50 mc./s. upwards. Moreover, owing to the fact that the modulation is applied at the transmitted frequency at a relatively high power level good economy is obained.

What is claimed is:

1. A frequency modulated transmitter, comprising a pair of electron discharge structures each including an electron emitting member, a grid-like member, and an electron receiving member; a resonant transmission line; means connecting the grid-like members of said structures to said line symmetrically on opposite sides of the midpoint thereof; means directly connecting the electron receiving members of said structures together; means connecting the electron emitting members of said structures to opposite sides of a tunable circuit, whereby said pair of structures operates as an oscillator; and means for tuning said tunable circuit in accordance with signals including an electron discharge tube having a grid and cathode in shunt to said tunable circuit and means for varying the impedance of said tube in accordance with signals.

2. A transmitter as claimed in claim 1, wherein the resonant transmission line is of the half-wave type.

3. A transmitter as claimed in claim 1, wherein the resonant transmission line is of the quarter-wave type.

4. A transmitter as claimed in claim 1, wherein oscillatory output power is taken off from the tunable circuit.

5. A transmitter as claimed in claim 1, wherein oscillatory output power is taken off by means of a loop electrically coupled to the transmission line.

6. A frequency modulated transmitter, comprising a pair of electron discharge structures, each including an electron emitting member, a grid-like member, and an electron receiving member; a resonant transmission line; means connecting the grid-like members of said structures to said line symmetrically on opposite sides of the midpoint thereof; means directly connecting the electron receiving members of said structures together; means connecting the electron emitting members of said structures to opposite sides of a tunable circuit, whereby said pair of structures operates as an oscillator; an electron discharge tube circuit arrangement connected and operated to act as a reactance connected to said tunable circuit; and means for controlling the potential of at least one of the electrodes of said last-named circuit arrangement in accordance with modulation, so as to modify the reactance thereby presented and thereby effect frequency modulation of the oscillator.

7. A transmitter as claimed in claim 6, wherein said tube circuit arrangement consists of a pair of tubes having their cathodes connected together and having their grids connected to opposite sides of the tunable circuit.

8. A transmitter as claimed in claim 6, wherein said tube circuit arrangement consists of a pair of tubes having their cathodes connected together and having their anodes electrically coupled to each other and having their grids connected to opposite sides of the tunable circuit.

9. A transmitter as claimed in claim 6, wherein said tube circuit arrangement consists of a pair of tubes having their cathodes connected together and having their grids connected to opposite sides of the tunable circuit, and wherein oscillatory output power is taken off from the tunable circuit.

10. A transmitter as claimed in claim 6, wherein oscillatory output power is taken off from the tunable circuit.

VICTOR JAMES COOPER.

REFERENCES CITED

The following references are of record in the file of this patent:

UNITED STATES PATENTS

| Number | Name | Date |
|---|---|---|
| 2,278,658 | Kroger | Apr. 7, 1942 |
| 2,321,269 | Artzt | June 8, 1943 |
| 2,335,278 | Hilferty | Nov. 30, 1943 |

FOREIGN PATENTS

| Number | Country | Date |
|---|---|---|
| 19,106/34 | Australia | Sept. 12, 1935 |
| 372,742 | Germany | Oct. 22, 1921 |